United States Patent
Louis et al.

(10) Patent No.: US 8,060,149 B1
(45) Date of Patent: Nov. 15, 2011

(54) WIRELESS RADIO AND HEADPHONES SYSTEM AND ASSOCIATED METHOD

(76) Inventors: Cynthia Louis, LaMesa, CA (US); Roy Bell, Jr., LaMesa, CA (US)

( * ) Notice: Subject to any disclaimer, the term of this patent is extended or adjusted under 35 U.S.C. 154(b) by 1100 days.

(21) Appl. No.: 11/888,245

(22) Filed: Jul. 31, 2007

Related U.S. Application Data

(60) Provisional application No. 60/820,868, filed on Jul. 31, 2006.

(51) Int. Cl.
*H04M 1/00* (2006.01)

(52) U.S. Cl. ............... 455/569.1; 455/575.1; 455/575.2; 455/575.3; 455/575.6; 455/556.1; 381/367; 381/369; 381/384

(58) Field of Classification Search ............... 455/575.1, 455/575.2, 575.3, 575.6, 575.8, 569.1, 596, 455/556.1, 557; 381/367, 369, 384
See application file for complete search history.

(56) References Cited

U.S. PATENT DOCUMENTS

| | | | | |
|---|---|---|---|---|
| 4,788,724 A | * | 12/1988 | Lazzeroni et al. | 2/422 |
| D376,598 S | * | 12/1996 | Hayashi | D14/206 |
| 6,212,414 B1 | * | 4/2001 | Alameh et al. | 455/575.6 |
| 6,366,250 B1 | * | 4/2002 | McConnell | 343/718 |
| 6,526,296 B1 | * | 2/2003 | Nieminen | 455/575.3 |
| 7,149,552 B2 | * | 12/2006 | Lair | 455/569.1 |
| 2005/0096096 A1 | * | 5/2005 | Birli et al. | 455/569.1 |
| 2005/0107131 A1 | * | 5/2005 | Abramov | 455/569.1 |
| 2005/0130593 A1 | * | 6/2005 | Michalak | 455/66.1 |
| 2005/0277452 A1 | * | 12/2005 | Pasamba | 455/575.6 |
| 2006/0121950 A1 | * | 6/2006 | Lee | 455/569.1 |

* cited by examiner

*Primary Examiner* — Rafael Pérez-Gutiérrez
*Assistant Examiner* — Lameka J. Kirk

(57) ABSTRACT

A system includes a portable transmitting unit and at least one portable receiving unit in wireless communication therewith. The receiving unit has at least one receiver positioned within a user ear and at least one microphone. A mechanism removably secures the receiving unit to the user ear, and a mechanism removably attaches the transmitting unit to a user body part. A mechanism protects the transmitting unit from damage caused by harsh environmental conditions and is removably attached to the transmitting unit.

16 Claims, 14 Drawing Sheets

WIRELESS RADIO AND HEADPHONES SYSTEM AND ASSOCIATED METHOD

CROSS REFERENCE TO RELATED APPLICATIONS

This application claims the benefit of U.S. Provisional Application No. 60/820,868, filed Jul. 31, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to radio and headphones systems and, more particularly, to a wireless radio and headphones system and associated method for allowing a user to listen to a radio while wearing a helmet and riding motorcycles and like vehicles.

2. Prior Art

The U.S. motorcycle industry has grown steadily in the past few years in large part due to spiraling gasoline costs. There are numerous advantages to riding a motorcycle and studies have shown that urban motorcyclists reach their destinations faster, park more easily, and consume fewer resources per mile than most cars. However, very few motorcycles are equipped with any type of audio system even though most motorcyclists enjoy music. This can make motorcycle trips, particularly long trips, boring and somewhat monotonous. The same is true for like vehicles such as bicycles, bipeds, mopeds, and four-wheelers. Having recognized the need for an audio sound system specially designed for use when riding a motorcycle and like vehicles, the present invention was developed.

One prior art examples shows a portable GPS/radio unit that communicates over a wireless radio network with at least one other such unit. The unit may transmit radio signals over the network indicative of the unit's location and receive similar radio signals from other such units. The unit is operable to display an indication of the distance between two or more units, an indication of the amount of time that has elapsed since location data was last received from another unit, a track log or track back information for another unit, and an indication if the unit is about to lose communications with another unit. The unit also may be operated to gather and transmit to other units location data corresponding to way points. The perspective or vantage point from which location data and other information is viewed may be selected or changed by the user of the unit. Unfortunately, this prior art example is not designed to worn on a user wrist during operating conditions.

Another prior art example shows a radio telephone system for use in a vehicle that is composed of an accessory mounted in the vehicle and a radio telephone that is separated from the accessory. The accessory transmits a mode switch signal indicating an operation state of the vehicle to the radio telephone by wireless means such as radio or infrared. When receiving the mode switch signal from the accessory, the radio telephone changes its operation mode depending on the mode switch signal. The operation state of the vehicle is an on/off state of an ignition key or a speed of the vehicle. Unfortunately, this prior art example is not designed to be worn by a user while riding a motorcycle and like vehicles during operating conditions.

Accordingly, a need remains for a wireless radio and headphones system and associated method in order to overcome the above-noted shortcomings. The present invention satisfies such a need by providing a system that is convenient to use, is lightweight yet durable in design, and allow a user to listen to a radio while wearing a helmet and riding motorcycles and like vehicles. The present invention is an audio entertainment system that makes riding any of the types of vehicles discussed less boring and more enjoyable. Such a system allows the user to enjoy all types of music while enjoying the freedom of the open road. The system is weatherproof and easy to attach to the user, and is simple to use, inexpensive, and designed for many years of repeated use.

BRIEF SUMMARY OF THE INVENTION

In view of the foregoing background, it is therefore an object of the present invention to provide a system for a wireless radio and headphones system and associated method. These and other objects, features, and advantages of the invention are provided by a wireless radio and headphones system for allowing a user to listen to a radio while wearing a helmet and riding motorcycles and like vehicles.

The system includes a portable transmitting unit. Such a transmitting unit includes a substantially square-shaped and planar base member, and a button integrally attached to a front edge of the base member. Such a button advantageously extends outwardly and away from the front edge of the base member. A universal serial bus port is integrally attached to the front edge of the base member and conveniently located adjacent to the button. A rechargeable power supply port is integrally attached to the front edge of the base member and located adjacent to the universal serial bus port such that the universal serial bus port is advantageously located intermediate of the button and the rechargeable power supply port. A rechargeable power supply source is effectively housed within the base member.

The transmitting unit further includes an audio/video playback device housed within the base member, and a user interface conveniently formed in a top surface of the base member and electrically coupled to the audio/video playback device. A satellite radio is electrically coupled to the user interface, and a processor is electrically coupled to the user interface. A memory is electrically coupled to the processor, and a transmitter is electrically coupled to the user interface and in wireless communication with the at least one receiving unit (herein described below).

The transmitting unit further includes a rigid and planar lid hingedly attached to the base member. Such a lid is coextensively shaped with the base member and further effectively covers the top surface of the base member and the user interface respectively when the lid is biased to a closed position. The lid is provided with a first liquid crystal display screen formed in an inner surface thereof and further is provided with a second liquid crystal display screen formed in an outer surface thereof respectively. The button of the base member effectively receives and captures the lid when the lid is biased to the closed position thereby advantageously prohibiting the lid from prematurely and undesirably biasing from the closed position during operating conditions.

The system further includes at least one portable receiving unit in wireless communication with the transmitting unit. Such an at least one receiving unit is conveniently provided with at least one receiver removably positioned within a selected ear of the user and at least one microphone positioned in close proximity to the user mouth. The at least one portable receiving unit further includes an elongated and flexible tube provided with opposed first and second ends respectively. A speaker is effectively formed in the second end of the tube, and an amplifier is electrically coupled to the speaker and housed within the second end of the tube. A receiving device is electrically coupled to the amplifier and housed within the second end of the tube. The microphone is formed with the first end of the tube, and is electrically coupled to the receiving device of the second end of the tube.

The system further includes a mechanism for removably securing the at least one portable receiving unit to the selected user ear. Such a removable securing mechanism conveniently includes a deformably resilient and flexible wire that has opposed top and bottom ends respectively. Such a bottom end of the wire is removably secured directly to the tube of the at least one portable receiving unit and is wrapped about the user ear such that the speaker of the at least one portable receiving unit is statically positioned within the user ear during operating conditions. A cushioned covering advantageously surrounds a major longitudinal length of the wire and effectively terminates proximal to the bottom end of the wire.

The system further includes a mechanism for removably attaching the transmitting unit to a selected user body part. Such a removable attaching mechanism includes a flexible strap that has a top surface directly attached to a bottom surface of the base member and further has opposed right and left ends respectively. Such a strap has a longitudinal length greater than a lateral width of the base member and oriented at a right angle thereto. A plurality of holes is formed in the right end of the strap, and the holes are equidistantly spaced along a major portion of the strap. Each of such holes is oriented along a centerline of the strap effectively defined by the longitudinal length of the strap, and a buckle is directly attached to the left end of the strap. The strap conveniently secures the transmitting unit about the selected user body part, and the holes and the strap and the buckle respectively cooperate to effectively prohibit the strap from prematurely and undesirably disconnecting from the selected user body part during operating conditions.

The system further includes a mechanism for protecting the transmitting unit from damage caused by harsh environmental conditions. Such a protective mechanism is removably attached to the transmitting unit. The protective mechanism includes a rigid cover removably affixed over the lid and the base member respectively when the lid is in the closed position.

The at least one portable receiving unit may further include a first receiver including an elongated and flexible tube conveniently provided with opposed first and second ends respectively, a speaker effectively formed in the second end of the tube, an amplifier electrically coupled to the speaker and housed within the second end of the tube, a receiving device electrically coupled to the amplifier and housed within the second end of the tube, and a microphone formed with the first end of the tube. Such a microphone is electrically coupled to the receiving device of the second end of the tube. The at least one portable receiving unit may further include a second receiver including a speaker effectively formed in the second receiver, an amplifier electrically coupled to the speaker and housed within the second receiver, and a receiving device electrically coupled to the amplifier and housed within the second receiver. Each of the first and second receivers respectively is in wireless communication with the transmitting unit, and each of the first and second receivers respectively is removably interfitted within an associated one of the user ears during operating conditions.

The at least one portable receiving unit may further include first and second receivers respectively. Each of such respective first and second receivers includes an elongated and flexible tube conveniently provided with opposed first and second ends respectively, a speaker effectively formed in the second end of the tube, an amplifier electrically coupled to the speaker and housed within the second end of the tube, a receiving device electrically coupled to the amplifier and housed within the second end of the tube, and a microphone formed with the first end of the tube. Such a microphone is electrically coupled to the receiving device of the second end of the tube. Each of the respective first and second receivers is removably interfitted within an associated one of the user ears during operating conditions.

The at least one portable receiving unit may further include an elongated and flexible tube provided with opposed first and second ends respectively. A speaker is effectively formed in each of the first and second ends respectively of the tube. An amplifier is electrically coupled to each of the speakers respectively and housed within the tube, a receiving device is electrically coupled to each of the amplifiers respectively and housed within the tube, and a microphone is formed in a medial portion of the tube. Such a microphone is electrically coupled to each of the receiving devices respectively of the tube. The first end and the second end respectively of the tube are removably interfitted within an associated one of the user ears during operating conditions.

A method for allowing a user to listen to a radio while wearing a helmet and riding motorcycles and like vehicles includes the steps of providing a portable transmitting unit, and providing at least one portable receiving unit in wireless communication with the transmitting unit. The at least one receiving unit is provided with at least one receiver removably positioned within a selected ear of the user and at least one microphone positioned in close proximity to the user mouth. The steps further include removably securing the at least one portable receiving unit to the selected user ear, removably attaching the transmitting unit to a selected user body part, and protecting the transmitting unit from damage caused by harsh environmental conditions. The protective mechanism is removably attached to the transmitting unit.

The step of providing a portable transmitting unit includes the steps of providing a substantially square-shaped and planar base member, and attaching a button to a front edge of the base member. Such a button extends outwardly and away from the front edge of the base member. The steps further include attaching a universal serial bus port to the front edge of the base member and located adjacent to the button, and attaching a rechargeable power supply port to the front edge of the base member and located adjacent to the universal serial bus port such that the universal serial bus port is located intermediate of the button and the rechargeable power supply port. The steps further include housing a rechargeable power supply source within the base member, housing an audio/video playback device within the base member, providing a user interface formed in a top surface of the base member and electrically coupled to the audio/video playback device, electrically coupling a satellite radio to the user interface, electrically coupling a processor to the user interface, electrically coupling a memory to the processor, electrically coupling a transmitter to the user interface and in wireless communication with the at least one receiving unit, and hingedly attaching a rigid and planar lid to the base member.

The lid is coextensively shaped with the base member and further covers the top surface of the base member and the user interface respectively when the lid is biased to a closed position. The lid is provided with a first liquid crystal display screen formed in an inner surface thereof and further is provided with a second liquid crystal display screen formed in an outer surface thereof respectively. The button of the base member receives and captures the lid when the lid is biased to the closed position thereby prohibiting the lid from prematurely and undesirably biasing from the closed position during operating conditions.

The step of providing at least one portable receiving unit includes the steps of providing an elongated and flexible tube that has opposed first and second ends respectively, providing a speaker formed in the second end of the tube, electrically coupling an amplifier to the speaker and housed within the second end of the tube, electrically coupling a receiving device to the amplifier and housed within the second end of the tube, and providing a microphone formed with the first end of the tube. Such a microphone is electrically coupled to the receiving device of the second end of the tube.

The step of removably securing the at least one portable receiving unit to the selected user ear includes the steps of providing a deformably resilient and flexible wire that has opposed top and bottom ends respectively and removably securing the bottom end of the wire directly to the tube of the at least one portable receiving unit. Such a wire is wrapped about the user ear such that the speaker of the at least one portable receiving unit is statically positioned with the user ear during operating conditions. The steps further include providing a cushioned covering surrounding a major longitudinal length of the wire and terminating proximal to the bottom end of the wire.

The step of removably attaching the transmitting unit to a selected user body part includes the steps of attaching a top surface of a flexible strap directly to a bottom surface of the base member. Such a strap has opposed right and left ends respectively, and has a longitudinal length greater than a lateral width of the base member and oriented at a right angle thereto. The steps further include providing a plurality of holes formed in the right end of the strap. Such holes are equidistantly spaced along a major portion of the strap, and each of the holes is oriented along a centerline of the strap defined by the longitudinal length of the strap. The steps further include attaching a buckle directly to the left end of the strap. The strap secures the transmitting unit about the selected user body part, and the holes and the strap and the buckle respectively cooperate to prohibit the strap from prematurely and undesirably disconnecting from the selected user body part during operating conditions.

The step of protecting the transmitting unit from damage caused by harsh environmental conditions includes the step of removably affixing a rigid cover over the lid and the base member respectively when the lid is in the closed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
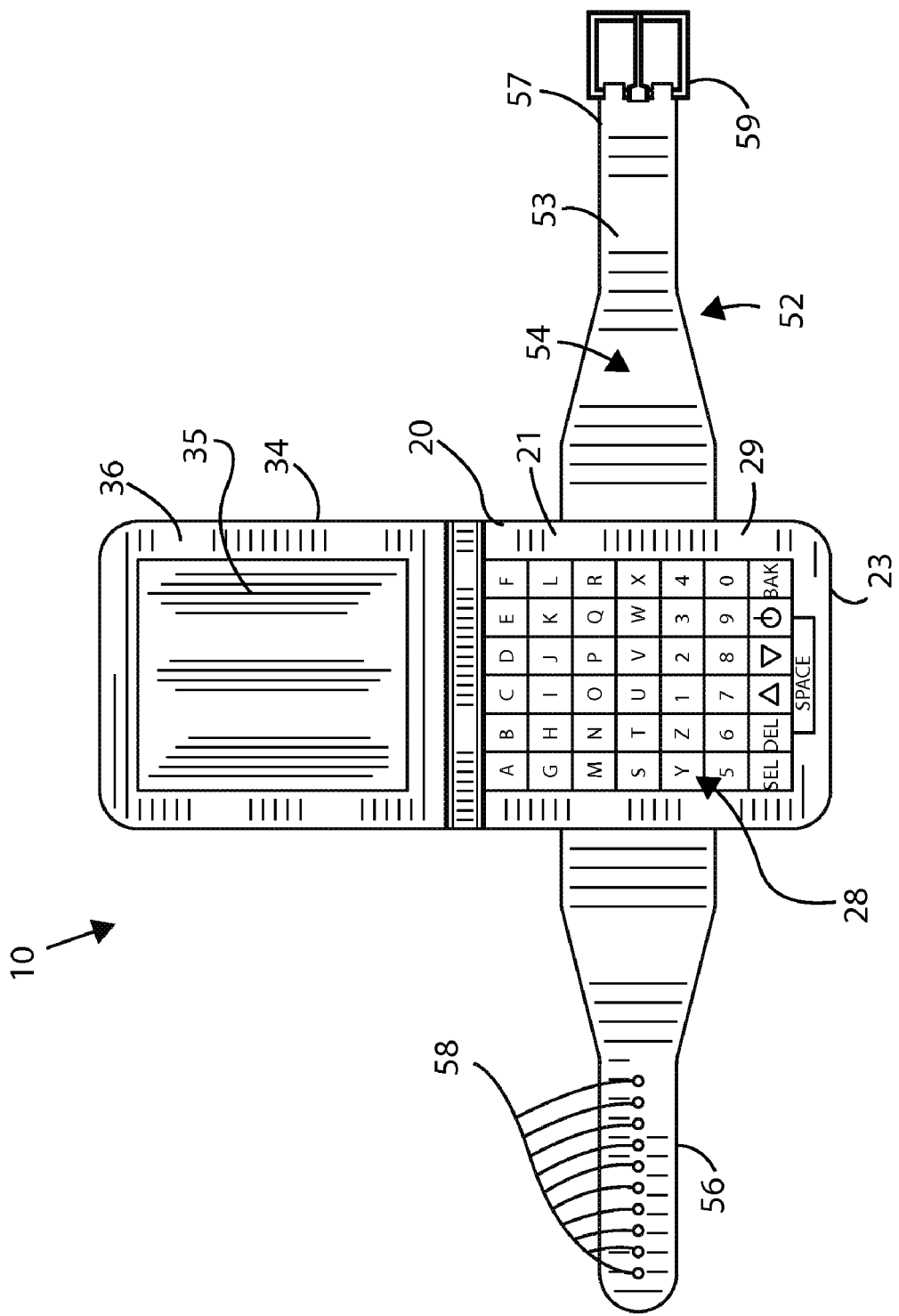
FIG. 1 is a top plan view of the transmitting unit showing the lid biased to the open position, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-14 by the reference numeral 10, 10A, 10B, and 10C and is intended to provide a system for a wireless radio and headphones system and associated method. It should be understood that the system 10, 10A, 10B, and 10C may be used to provide audio sounds in many different types of environments and should not be limited in use to providing audio sounds only in those types of environments described herein.

Referring initially to FIGS. 1, 2, 3, 4, 5, 6, 7, 8 and 14, the system 10 includes a portable transmitting unit 20. Such a transmitting unit 20 includes a substantially square-shaped and planar base member 21, and a button 22 integrally attached to a front edge 23 of the base member 21. Such a button 22 extends outwardly and away from the front edge 23 of the base member 21. A universal serial bus port 24 is integrally attached to the front edge 23 of the base member 21 and located adjacent to the button 22. A rechargeable power supply port 25 is integrally attached to the front edge 23 of the base member 21 and located adjacent to the universal serial bus port 24, which is essential such that the universal serial bus port 24 is located intermediate of the button 22 and the rechargeable power supply port 25. A rechargeable power supply source 26 is housed within the base member 21 and connected to the rechargeable power supply port 25 for allowing the user to recharge the rechargeable power supply source 26 when drained.

Figure 14:
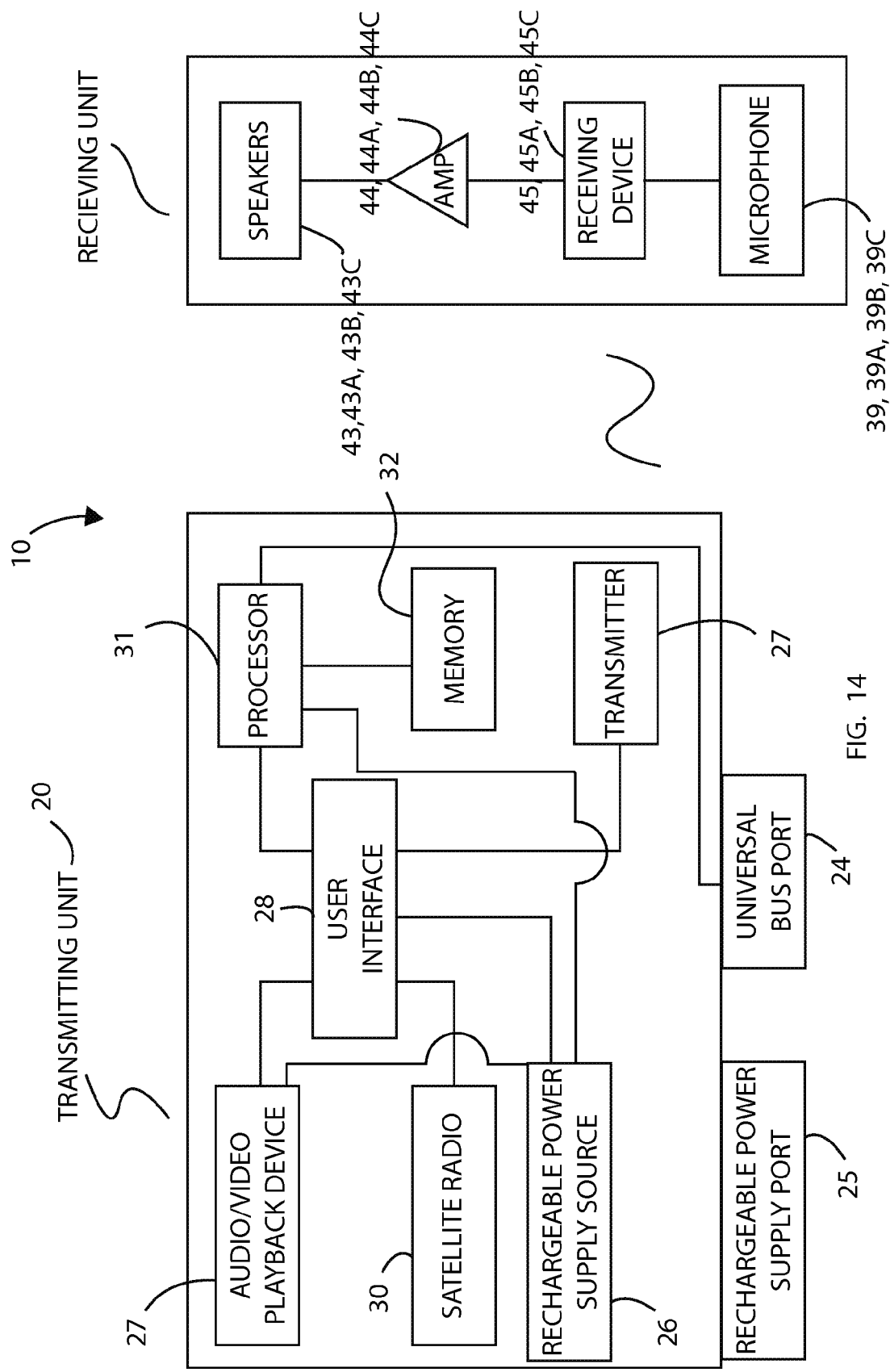
FIG. 14 is a schematic diagram of the transmitting unit and the receiving unit respectively.

Referring to FIGS. 1 and 14, the transmitting unit 20 further includes an audio/video playback device 27 housed within the base member 21, and a user interface 28 formed in a top surface 29 of the base member 21 and electrically coupled to the audio/video playback device 27. A satellite radio 30 is electrically coupled to the user interface 28, and a processor 31 is electrically coupled to the user interface 28. A memory 32 is electrically coupled to the processor 31, and a transmitter 33 is electrically coupled to the user interface 28 and in wireless communication with the at least one receiving unit 50 (herein described below).

Again referring to FIGS. 1 through 8 and 14, the transmitting unit 20 further includes a rigid and planar lid 34 hingedly attached to the base member 21. Such a lid 34 is coextensively shaped with the base member 21 and further covers the top surface 29 of the base member 21 and the user interface 28 respectively when the lid 34 is biased to a closed position. The lid 34 protects the user interface 28 formed in the top surface 29 of the base member 21 when the lid 34 is biased to the closed position. The lid 34 is provided with a first liquid crystal display screen 35 formed in an inner surface 36 thereof and further is provided with a second liquid crystal display screen 66 formed in an outer surface 37 thereof respectively. The button 22 of the base member 21 receives and captures the lid 34 when the lid 34 is biased to the closed position, which is critical to thereby prohibit the lid 34 from prematurely and undesirably biasing from the closed position during operating conditions. The lid 34 may also have a speaker attached to the outer surface 37 thereof.

Figure 9:
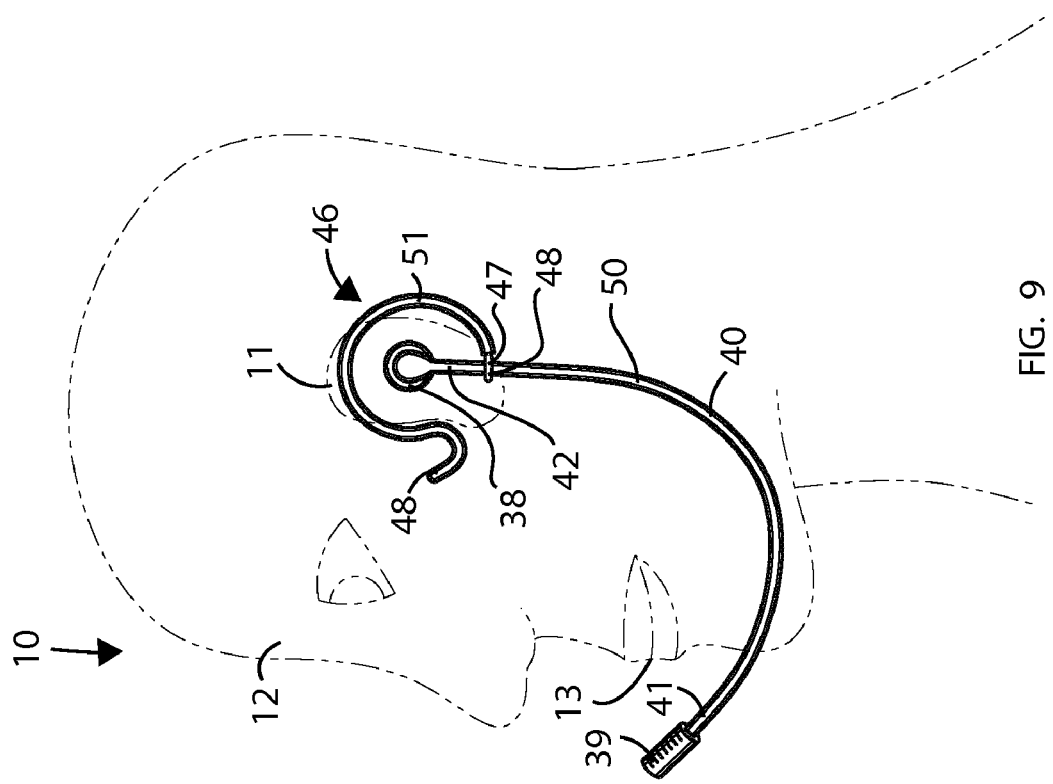
FIG. 9 is a side elevational view of the receiving unit shown attached to the user head.
Figure 10:
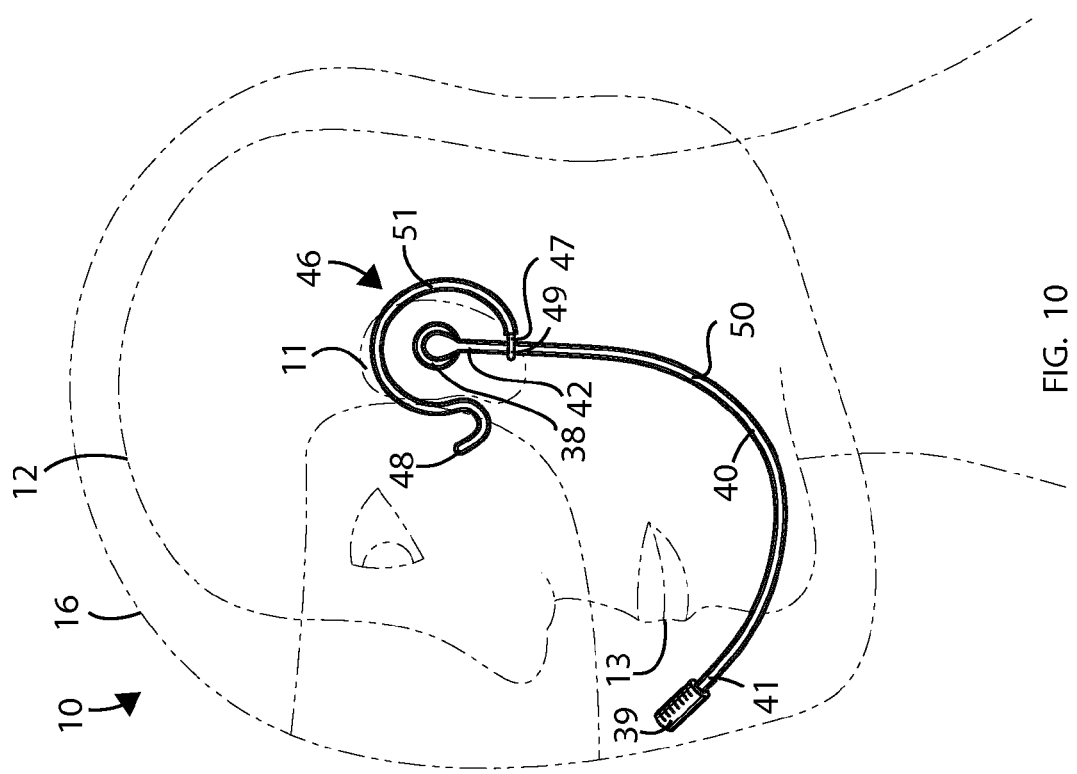
FIG. 10 is a side elevational view of the receiving unit shown in FIG. 9 shown attached to the user head and surrounded by an existing helmet.

Referring to FIGS. 9, 10 and 14, the system 10 further includes at least one portable receiving unit 50 in wireless communication with the transmitting unit 20. Such an at least one receiving unit 50 is provided with at least one receiver 38 removably positioned within a selected ear 11 of the user 12 and at least one microphone 39 positioned in close proximity to the user mouth 13. The at least one portable receiving unit 50 further includes an elongated and flexible tube 40 provided with opposed first 41 and second ends 42 respectively. Such a tube 40 allows the user to position the microphone 39 in a comfortable position and near the user mouth 13 as needed. A speaker 43 is formed in the second end 42 of the tube 40, and an amplifier 44 is electrically coupled to the speaker 43 and housed within the second end 42 of the tube 40. A receiving device 45 is electrically coupled to the amplifier 44 and housed within the second end 42 of the tube 40. The microphone 39 is formed with the first end 41 of the tube 40, and is electrically coupled to the receiving device 45 of the second end 42 of the tube 40.

FIG. 14 shows a signaling system 10 with a transmitting unit, at least one receiving unit communicating over an air interface for communicating with an audio/video playback device, a satellite radio or other subscriber-initiated services. The signaling system operates for example in accordance with a standard known to experts as ISDN (Integrated Services Digital Network). There is unidirectional data transmission over the air interface between a first receiving unit assigned to a predetermined signaling transmission frequency and a transmitting unit assigned to the portable wrist watch. As in the exemplary embodiment, this air interface can be designed in accordance with an embodiment familiar to the expert as the Bluetooth Standard as a radio interface or also in accordance with an embodiment familiar to the expert as the IrDA Standard (Infrared Data Association) as an optical interface.

The signaling system operates in accordance with a time-slot-oriented switching principle—often referred to among experts as "Time Division Multiplex", TDM—and accordingly has a corresponding TDM switching matrix. A line of the signaling system transmitting payload or signaling information is connected via a line/trunk unit assigned to the signaling system to the switching matrix TDM or to the processor—further central component of the signaling system.

Signaling information corresponds to data which, with an ISDN connection for example, is transmitted over what is referred to as a D channel—not shown—and contains data for connection control, signaling etc. A further component of the data exchanged between the transmitting unit and the at least one receiving unit is the payload information which contains voice and/or video signaling data for example. In an ISDN signaling system this payload information is transmitted over one or more B channels—not shown. In the ISDN-based signaling system the transmitting unit is linked via a communications air link with two B channels to the line/trunk unit.

In the processor, a number of software functional modules handle connection control, service feature processes and such are administered. A mobile subscriber service feature can be called up in a signaling system and is processed in the processor by calling the software module subscribing unit that is monitored by a service provider. A mobile subscriber carrying the transmitting unit with them is located in the vicinity of the receiving units. The transmitting unit is for example realized in an embodiment as a mobile signaling transmitter or also as a Personal Digital Assistant (PDA).

In the present exemplary embodiment the transmitting unit includes functionalities of a mobile signaling system. These functionalities also include provisions of an audible input and output of information. The sequence of a process for requesting signaling by the mobile subscriber at the signaling system is described below.

By pressing an input button on the user interface, the mobile subscriber activates the service feature. In the transmitting unit, a request containing subscriber identification and authorization data is then generated automatically. This request is transferred over the air interface to a monitoring station and sent as signaling information to the processor. In the processor the software module, which uses the identification and authorization data transmitted from the transmitting unit to check authorizations of the subscriber in the signaling system. After the authenticity of the subscriber is ensured, their personal authorizations, specific functions of their membership of subscriber groups, their personal detailed billing and call charge recording assignment as well as their personal service feature arrangements are created at the monitoring station. In addition all calls directed to the mobile subscriber's number are put thru.

By connecting signal transmission from the transmitting unit to the receiving units via two radio channels, the receiving unit is thus available independently of a use of the transmitting unit for incoming or outgoing signaling connections.

Figure 8:
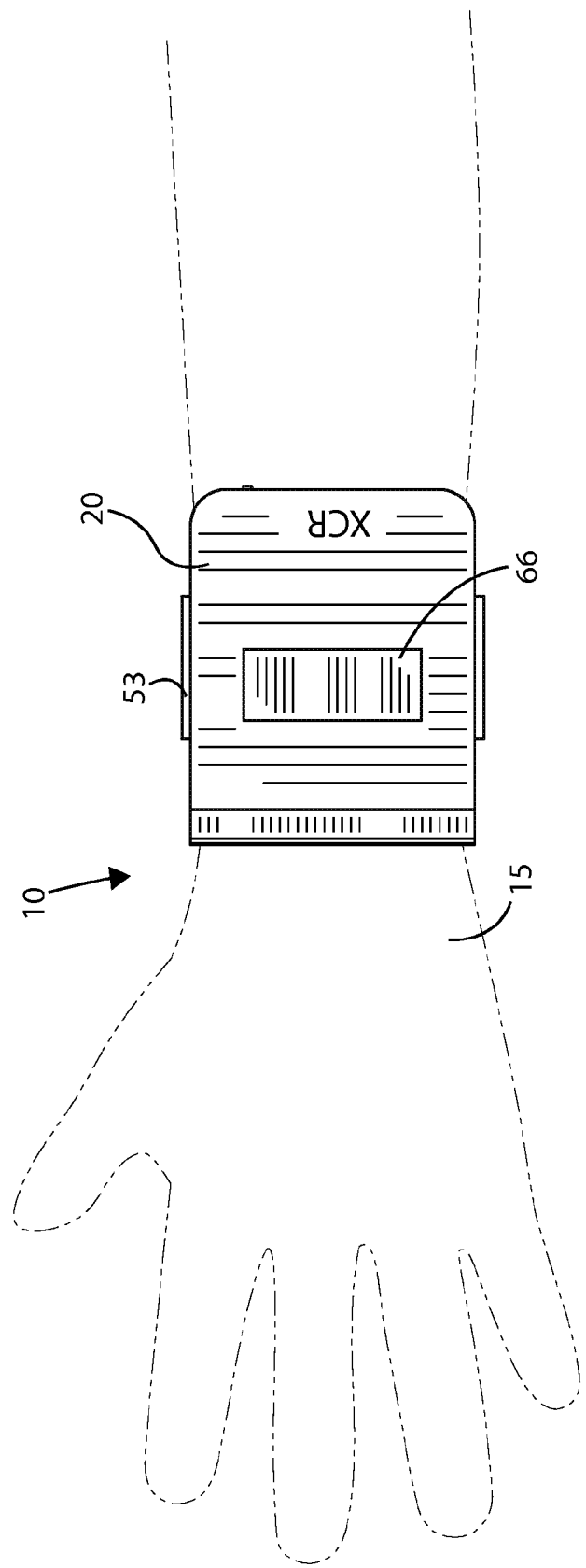
FIG. 8 is a top plan view of the transmitting unit secured to the user wrist.
Figure 11:
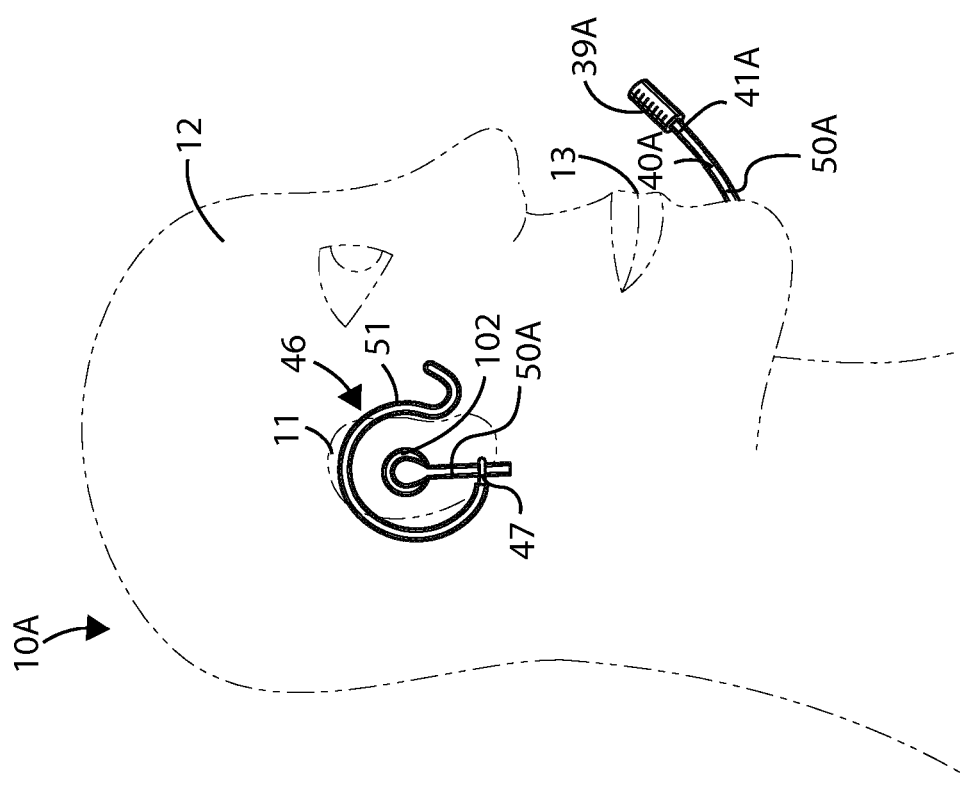
FIG. 11 is a side elevational view of the receiving unit, in an alternate embodiment, shown attached to the user head.

Referring to FIGS. 8, 9 and 11, the system 10 further includes a mechanism 46 for removably securing the at least one portable receiving unit 50 to the user ear 11. Such a removable securing mechanism 46 includes a deformably resilient and flexible wire 47 that has opposed top 48 and bottom 49 ends respectively. Such a bottom end 49 of the wire 47 is removably secured directly to the tube 40 of the at least one portable receiving unit 50, without the use of intervening elements, and is wrapped about the user ear 11, which is necessary such that the speaker 43 of the at least one portable receiving unit 50 is statically positioned within the user ear 11 during operating conditions. A cushioned covering 51 surrounds a major longitudinal length of the wire 47 and terminates proximal to the bottom end 49 of the wire 47. Such a covering 51 provides a comfortable surface against the user skin while the at least one portable receiving unit 50 is attached to the user head 12 during operating conditions.

Referring to FIGS. 1, 2, 3, 4, 6, 7 and 8, the system 10 further includes a mechanism 52 for removably attaching the transmitting unit 20 to a selected user body part 15. Such a removable attaching mechanism 52 includes a flexible strap 53 that has a top surface 54 directly attached to a bottom surface 55 of the base member 21, without the use of intervening elements, and further has opposed right 56 and left 57 ends respectively. Such a strap 53 has a longitudinal length greater than a lateral width of the base member 21 and oriented at a right angle thereto. A plurality of holes 58 is formed in the right end 56 of the strap 53, and the holes 58 are equidistantly spaced along a major portion of the strap 53. Each of such holes 58 is oriented along a centerline of the strap 53 defined by the longitudinal length of the strap 53, and a buckle 59 is directly attached to the left end 57 of the strap 53, without the use of intervening elements.

The strap 53 secures the transmitting unit 20 about the selected user body part 15, and the holes 58 and the strap 53 and the buckle 59 respectively cooperate to prohibit the strap 53 from prematurely and undesirably disconnecting from the selected user body part 15 during operating conditions. Alternatively, the strap 53 may be fastened using hook-and-loop type fasteners, and snap-closures, as examples. The strap 53 does not interfere with the use of the user hand while the transmitting unit 20 is attached to the selected user body part 15.

Figure 2:
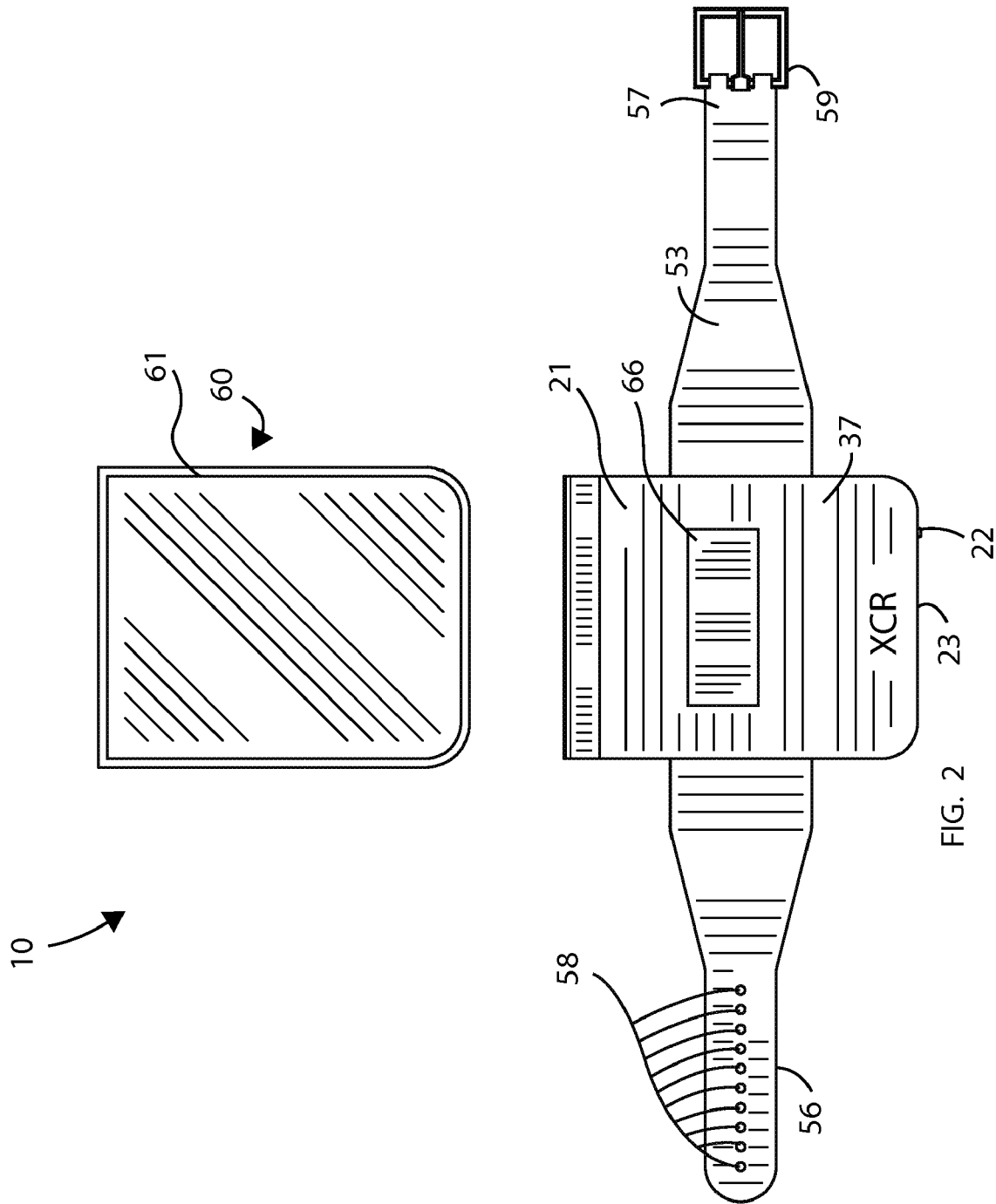
FIG. 2 is a top plan view of the transmitting unit shown in FIG. 1 showing the lid biased to the closed position, and the cover detached therefrom.
Figure 3:
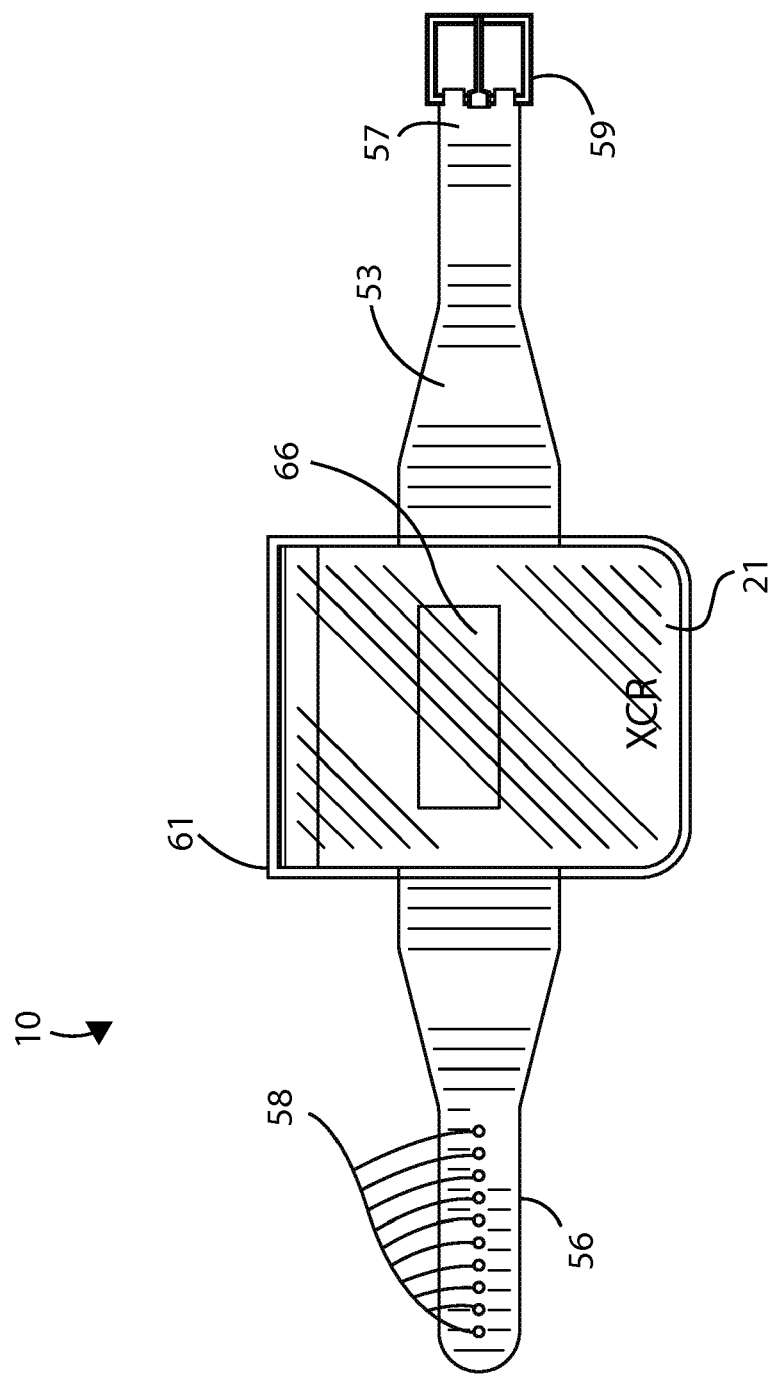
FIG. 3 is a top plan view of the transmitting unit shown in FIG. 2 showing the cover attached thereto.
Figure 4:
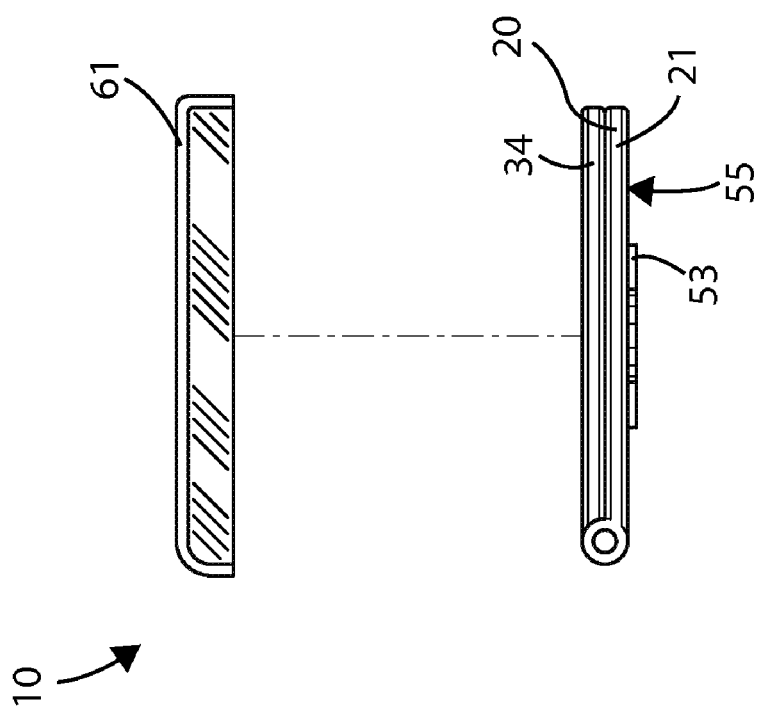
FIG. 4 is a side elevational view of the transmitting unit showing the cover detached therefrom.
Figure 5:
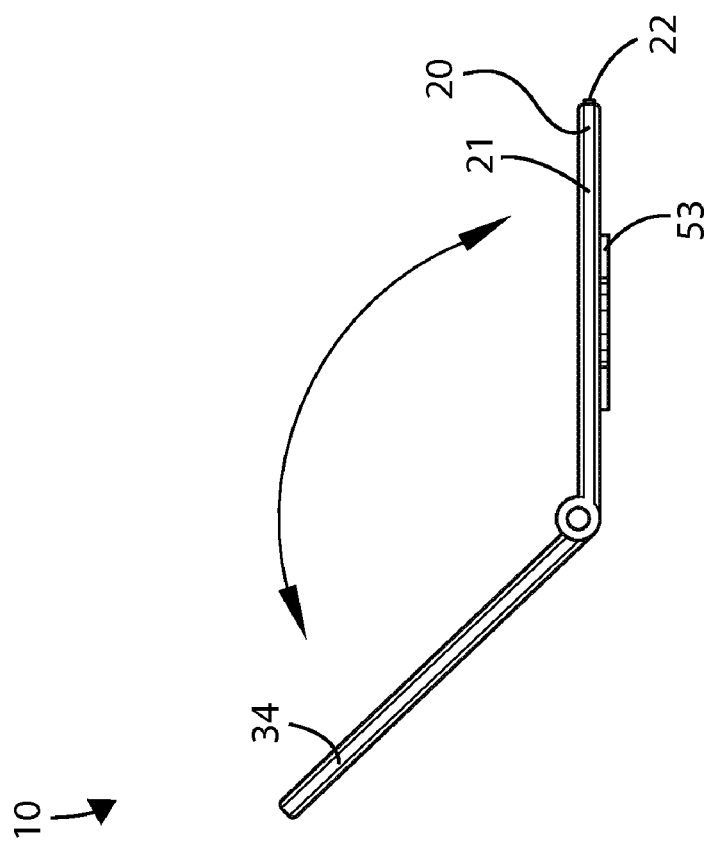
FIG. 5 is a side elevational view of the transmitting unit showing the lid biased to an open position.
Figure 6:
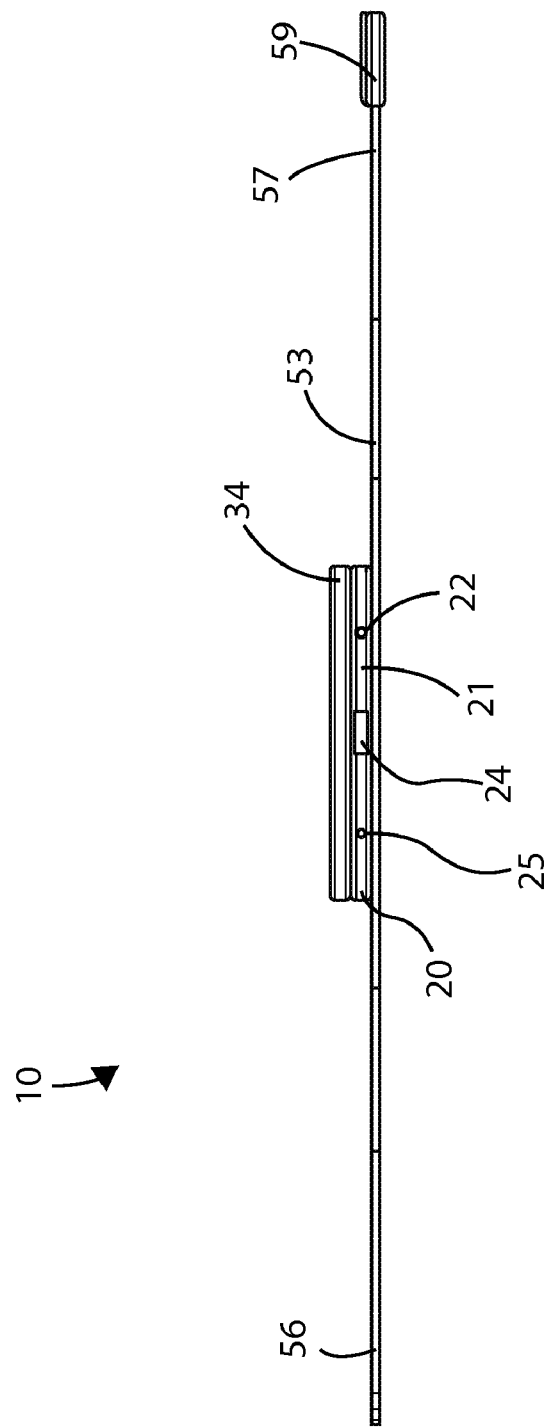
FIG. 6 is a front elevational view of the transmitting unit attached to the strap.
Figure 7:
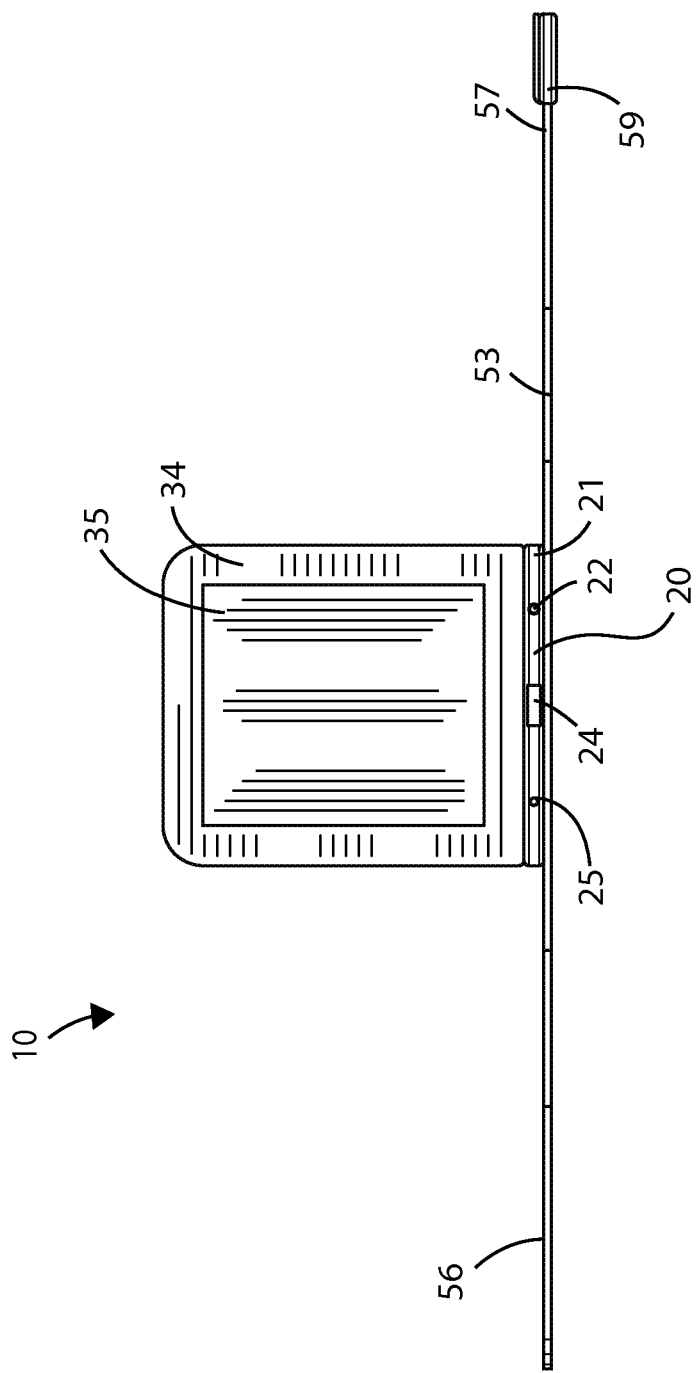
FIG. 7 is a front elevational view of the transmitting unit and the strap shown in FIG. 6 showing the lid biased to the open position.

Referring to FIGS. 2, 3 and 4, the system 10 further includes a mechanism 60 for protecting the transmitting unit 20 from damage caused by harsh environmental conditions. Such a protective mechanism 60 is removably attached to the transmitting unit 20. The protective mechanism 60 includes a rigid cover 61 removably affixed over the lid 34 and the base member 21 respectively when the lid 34 is in the closed position. The cover 61 provides a barrier between the transmitting unit 20 and moisture, as well as preventing rocks, sticks and other types of debris from contacting the transmitting unit 20 during operating conditions.

Referring to FIGS. 11 and 14, in an alternate embodiment 10A, the at least one portable receiving unit 50A may further include a first receiver including an elongated and flexible tube 40A provided with opposed first 41A and second ends respectively, a speaker 43A formed in the second end of the tube 40A, an amplifier 44A electrically coupled to the speaker 43A and housed within the second end of the tube 40A, a receiving device 45A electrically coupled to the amplifier 44A and housed within the second end of the tube 40A, and a microphone 39A formed with the first end 41A of the tube 40A. Such a microphone 39A is electrically coupled to the receiving device 45A of the second end of the tube 40A. The at least one portable receiving unit 50A may further include a second receiver 102 including a speaker 43A formed in the second receiver 102, an amplifier 44A electrically coupled to the speaker 43A and housed within the second receiver 102, and a receiving device 45A electrically coupled to the amplifier 44A and housed within the second receiver 102. Each of the first and second receivers, 102 respectively is in wireless communication with the transmitting unit 20, and each of the first and second receivers, 102 respectively is removably interfitted within an associated one of the user ears 11 during operating conditions.

Figure 12:
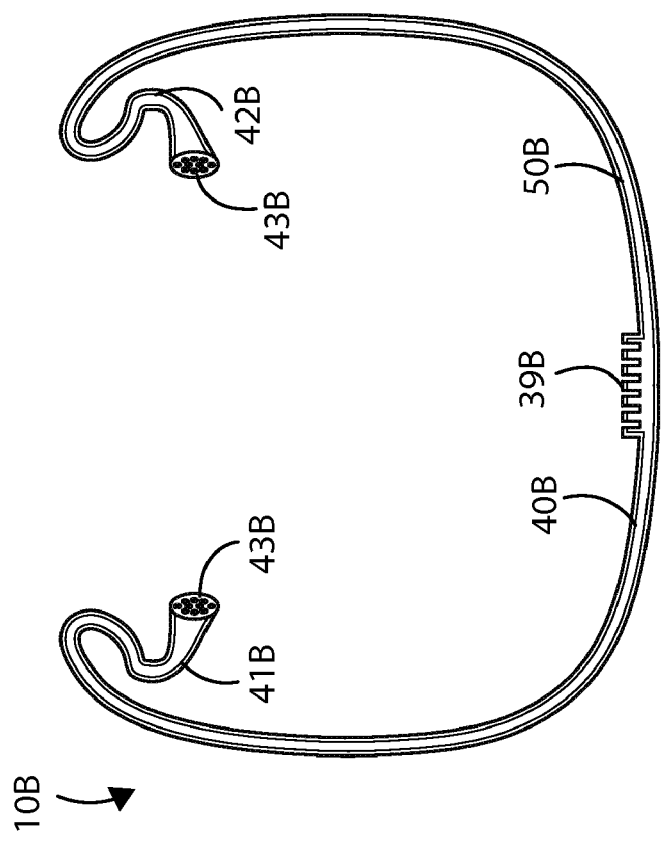
FIG. 12 is a side elevational view of the receiving unit, in another alternate embodiment, shown attached to the user head.

Referring to FIGS. 12 and 14, in another alternate embodiment 10B, the at least one portable receiving unit 50B may further include an elongated and flexible tube 40B provided with opposed first 41B and second 42B ends respectively. A speaker 43B is formed in each of the first and second ends 41B, 42B respectively of the tube 40B. An amplifier 44B is electrically coupled to each of the speakers 43B respectively and housed within the tube 40B, a receiving device 45B is electrically coupled to each of the amplifiers 44B respectively and housed within the tube 40B, and a microphone 39B is formed in a medial portion of the tube 40B. Such a microphone 39B is electrically coupled to each of the receiving devices 45B respectively of the tube 40B. The first end 41B and the second end 42B respectively of the tube 40B are removably interfitted within an associated one of the user ears 11 during operating conditions.

Figure 13:
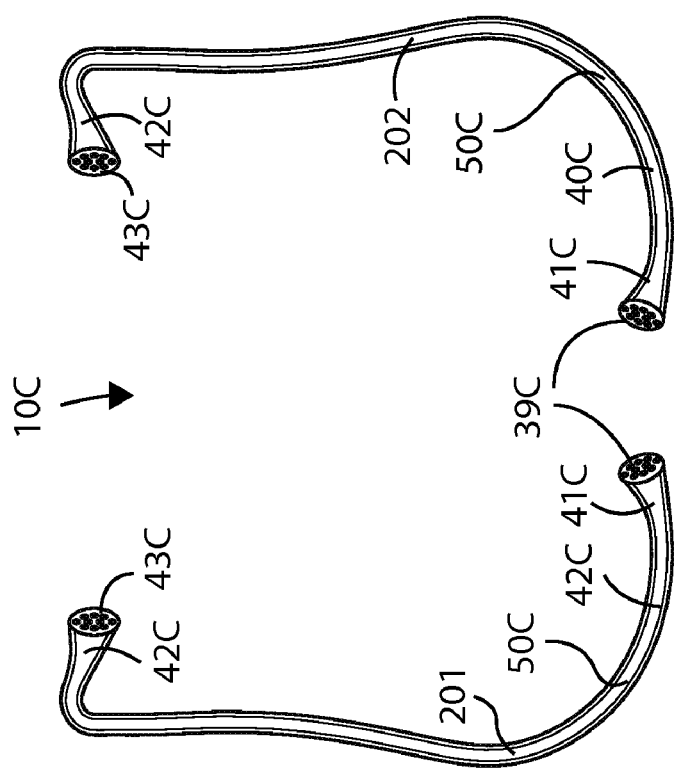
FIG. 13 is a side elevational view of the receiving unit, in yet another alternate embodiment, shown attached to the user head.

Referring to FIGS. 13 and 14, in yet another alternate embodiment 10C, the at least one portable receiving unit 50C may further include first 201 and second 202 receivers respectively. Each of such respective first and second receivers 201, 202 includes an elongated and flexible tube 40C provided with opposed first 41C and second 42C ends respectively, a speaker 43C formed in the second end 42C of the tube 40C, an amplifier 44C electrically coupled to the speaker 43C and housed within the second end 42C of the tube 40C, a receiving device 45C electrically coupled to the amplifier 44C and housed within the second end 42C of the tube 40C, and a microphone 39C formed with the first end 41C of the tube 40C. Such a microphone 39C is electrically coupled to the receiving device 45C of the second end 42C of the tube 40C. Each of the respective first and second receivers 201, 202 is removably interfitted within an associated one of the user ears 11 during operating conditions.

The wireless communication between the transmitting unit 20 and the receiving unit 34 provides the unexpected benefit of allowing the user to enjoy audio sounds while riding a motorcycle and like vehicles without the necessity of the transmitting unit 20 and the receiving unit 34 being directly connected. In addition, the user hand is free to move as needed without being impeded by the transmitting unit 20 attached thereto.

A method 10 for allowing a user to listen to a radio while wearing a helmet 16 and riding motorcycles and like vehicles includes the steps of providing a portable transmitting unit 20, and providing at least one portable receiving unit 50 in wireless communication with the transmitting unit 20. The at least one receiving unit 50 is provided with at least one receiver 101 removably positioned within a selected ear 11 of the user 12 and at least one microphone 39 positioned in close proximity to the user mouth 13. The steps further include removably securing the at least one portable receiving unit 50 to the selected user ear 11, removably attaching the transmitting unit 20 to a selected user body part 15, and protecting the transmitting unit 20 from damage caused by harsh environmental conditions. The protective mechanism 60 is removably attached to the transmitting unit 20.

The step of providing a portable transmitting unit includes the steps of providing a substantially square-shaped and planar base member 21, and attaching a button 22 to a front edge 23 of the base member 21. Such a button 22 extends outwardly and away from the front edge 23 of the base member 21. The steps further include attaching a universal serial bus port 24 to the front edge 23 of the base member 21 and located adjacent to the button 22, and attaching a rechargeable power supply port 25 to the front edge 23 of the base member 21 and located adjacent to the universal serial bus port 24 such that the universal serial bus port 24 is located intermediate of the button 22 and the rechargeable power supply port 25. The steps further include housing a rechargeable power supply source 26 within the base member 21, housing an audio/video playback device 27 within the base member 21, providing a user interface 28 formed in a top surface 29 of the base member 21 and electrically coupled to the audio/video playback device 27, electrically coupling a satellite radio 30 to the user interface 28, electrically coupling a processor 31 to the user interface 28, electrically coupling a memory 32 to the processor 31, electrically coupling a transmitter 33 to the user interface 28 and in wireless communication with the at least one receiving unit 50 (herein described below), and hingedly attaching a rigid and planar lid 34 to the base member 21.

The lid 34 is coextensively shaped with the base member 21 and further covers the top surface 29 of the base member 21 and the user interface 28 respectively when the lid 34 is biased to a closed position. The lid 34 is provided with a first liquid crystal display screen 35 formed in an inner surface 36 thereof and further is provided with a second liquid crystal display screen 66 formed in an outer surface 37 thereof respectively. The button 22 of the base member 21 receives and captures the lid 34 when the lid 34 is biased to the closed position thereby prohibiting the lid 34 from prematurely and undesirably biasing from the closed position during operating conditions.

The step of providing the at least one portable receiving unit 50 includes the steps of providing an elongated and flexible tube 40 that has opposed first 41 and second 42 ends respectively, providing a speaker 43 formed in the second end 42 of the tube 40, electrically coupling an amplifier 44 to the speaker 43 and housed within the second end 42 of the tube 40, electrically coupling a receiving device 45 to the amplifier 44 and housed within the second end 42 of the tube 40, and providing a microphone 39 formed with the first end 41 of the tube 40. Such a microphone 39 is electrically coupled to the receiving device 45 of the second end 42 of the tube 40.

The step of removably securing the at least one portable receiving unit 50 to the selected user ear 11 includes the steps of providing a deformably resilient and flexible wire 47 that has opposed top 48 and bottom 49 ends respectively and removably securing the bottom end 49 of the wire 47 directly to the tube 40 of the at least one portable receiving unit 50, without the use of intervening elements. Such a wire 47 is wrapped about the user ear 11 such that the speaker 43 of the at least one portable receiving unit 50 is statically positioned within the user ear 11 during operating conditions. The steps further include providing a cushioned covering 51 surrounding a major longitudinal length of the wire 47 and terminating proximal to the bottom end 49 of the wire 47.

The step of removably attaching the transmitting unit 20 to a selected user body part 15 includes the steps of attaching a top surface 54 of a flexible strap 53 directly to a bottom surface 55 of the base member 21, without the use of intervening elements. Such a strap 53 has opposed right 56 and left 57 ends respectively, and has a longitudinal length greater than a lateral width of the base member 21 and oriented at a right angle thereto. The steps further include providing a plurality of holes 58 formed in the right end 56 of the strap 53. Such holes 58 are equidistantly spaced along a major portion of the strap 53, and each of the holes 58 is oriented along a centerline of the strap 53 defined by the longitudinal length of the strap 53. The steps further include attaching a buckle 59 directly to the left end 57 of the strap 53, without the use of intervening elements. The strap 53 secures the transmitting unit 20 about the selected user body part 15, and the holes 58 and the strap 53 and the buckle 59 respectively cooperate to prohibit the strap 53 from prematurely and undesirably disconnecting from the selected user body part 15 during operating conditions.

The step of protecting the transmitting unit 20 from damage caused by harsh environmental conditions includes the step of removably affixing a rigid cover 61 over the lid 34 and the base member 21 respectively when the lid 34 is biased to the closed position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A wireless radio and headphones system for allowing a user to listen to a radio while wearing a helmet and riding motorcycles, said radio and headphones system comprising:
   a portable transmitting unit;
   at least one portable receiving unit in wireless communication with said transmitting unit, said at least one receiving unit being provided with at least one receiver removably positioned within a selected ear of the user and at least one microphone positioned in close proximity to the user mouth;
   means for removably securing said at least one portable receiving unit to the selected user ear;
   means for removably attaching said transmitting unit to a selected user body part; and
   means for protecting said transmitting unit from damage caused by harsh environmental conditions, said protective means being removably attached to said transmitting unit;
   wherein said transmitting unit comprises:
   a substantially square-shaped and planar base member;
   a button integrally attached to a front edge of said base member, said button extending outwardly and away from said front edge of said base member;
   a universal serial bus port integrally attached to said front edge of said base member and located adjacent to said button;

a rechargeable power supply port integrally attached to said front edge of said base member and located adjacent to said universal serial bus port such that said universal serial bus port is located intermediate of said button and said rechargeable battery port;

a rechargeable power supply source housed within said base member; an audio/video playback device housed within said base member;

a user interface formed in a top surface of said base member and electrically coupled to said audio/video playback device;

a satellite radio electrically coupled to said user interface; a processor electrically coupled to said user interface; a memory electrically coupled to said processor;

a transmitter electrically coupled to said user interface and in wireless communication with said at least one receiving unit; and a rigid and planar lid hingedly attached to said base member, said lid being coextensively shaped with said base member and further covering said top surface of said base member and said user interface respectively when said lid is biased to a closed position, said lid being provided with a first liquid crystal display screen formed in an inner surface thereof and further being provided with a second liquid crystal display screen formed in an outer surface thereof respectively;

wherein said button of said base member receives and captures said lid when said lid is biased to the closed position thereby prohibiting said lid from prematurely and undesirably biasing from the closed position during operating conditions.

2. The radio and headphones system of claim 1, wherein said at least one portable receiving unit comprises:
an elongated and flexible tube being provided with opposed first and second ends respectively;
a speaker formed in said second end of said tube;
an amplifier electrically coupled to said speaker and housed within said second end of said tube;
a receiving device electrically coupled to said amplifier and housed within said second end of said tube; and
a microphone formed with said first end of said tube, said microphone being electrically coupled to said receiving device of said second end of said tube.

3. The radio and headphones system of claim 2, wherein said removable securing means comprises:
a deformably resilient and flexible wire having opposed top and bottom ends respectively, said bottom end of said wire being removably secured directly to said tube of said at least one portable receiving unit, said wire being wrapped about the user ear such that said speaker of said at least one portable receiving unit is statically positioned within the user ear during operating conditions; and
a cushioned covering surrounding a major longitudinal length of said wire and terminating proximal to said bottom end of said wire.

4. The radio and headphones system of claim 3, wherein said removable attaching means comprises:
a flexible strap having a top surface directly attached to a bottom surface of said base member and further having opposed right and left ends respectively, said strap having a longitudinal length greater than a lateral width of said base member and oriented at a right angle thereto;
a plurality of holes formed in said right end of said strap, said holes being equidistantly spaced along a major portion of said strap, each said holes being oriented along a centerline of said strap defined by said longitudinal length of said strap; and
a buckle directly attached to said left end of said strap;
wherein said strap secures said transmitting unit about the selected user body part, said holes and said strap and said buckle respectively cooperating to prohibit said strap from prematurely and undesirably disconnecting from the selected user body part during operating conditions.

5. The radio and headphones system of claim 4, wherein said protective means comprises:
a rigid cover removably affixed over said lid and said base member respectively when said lid is in the closed position.

6. The radio and headphones system of claim 5, wherein said at least one portable receiving unit comprises:
a first receiver comprising
an elongated and flexible tube being provided with opposed first and second ends respectively;
a speaker formed in said second end of said tube;
an amplifier electrically coupled to said speaker and housed within said second end of said tube;
a receiving device electrically coupled to said amplifier and housed within said second end of said tube; and
a microphone formed with said first end of said tube, said microphone being electrically coupled to said receiving device of said second end of said tube; and
a second receiver comprising
a speaker formed in said second receiver;
an amplifier electrically coupled to said speaker and housed within said second receiver; and
a receiving device electrically coupled to said amplifier and housed within said second receiver;
wherein each of said first and second receivers respectively is in wireless communication with said transmitting unit;
wherein each of said first and second receivers respectively is removably interfitted within an associated one of the user ears during operating conditions.

7. The radio and headphones system of claim 6, wherein said at least one portable receiving unit comprises:
first and second receivers respectively, each of said respective first and second receivers comprising
an elongated and flexible tube being provided with opposed first and second ends respectively;
a speaker formed in said second end of said tube;
an amplifier electrically coupled to said speaker and housed within said second end of said tube;
a receiving device electrically coupled to said amplifier and housed within said second end of said tube; and
a microphone formed with said first end of said tube, said microphone being electrically coupled to said receiving device of said second end of said tube;
wherein each of said respective first and second receivers is removably interfitted within an associated one of the user ears during operating conditions.

8. The radio and headphones system of claim 7, wherein said at least one portable receiving unit comprises:
an elongated and flexible tube being provided with opposed first and second ends respectively;
a speaker formed in each of said first and second ends respectively of said tube;
an amplifier electrically coupled to each of said speakers respectively and housed within said tube;
a receiving device electrically coupled to each of said amplifiers respectively and housed within said tube; and a microphone formed in a medial portion of said tube, said microphone being electrically coupled to each of said receiving devices respectively of said tube;

wherein said first end and said second end respectively of said tube are removably interfitted within an associated one of the user ears during operating conditions.

9. A method for allowing a user to listen to a radio while wearing a helmet and riding motorcycles, said method comprising the steps of:
 a) providing a portable transmitting unit;
 b) providing at least one portable receiving unit in wireless communication with said transmitting unit, said at least one receiving unit being provided with at least one receiver removably positioned within a selected ear of the user and at least one microphone positioned in close proximity to the user mouth;
 c) removably securing said at least one portable receiving unit to the selected user ear;
 d) removably attaching said transmitting unit to a selected user body part; and
 e) protecting said transmitting unit from damage caused by harsh environmental conditions, said protective means being removably attached to said transmitting unit.

wherein step a) comprises the steps of:
 i) Providing a substantially square-shaped and planar base member;
 ii) attaching a button to a front edge of said base member, said button extending outwardly and away from said front edge of said base member;
 iii) attaching a universal serial bus port to said front edge of said base member and located adjacent to said button;
 iv) attaching a rechargeable power supply port to said front edge of said base member and located adjacent to said universal serial bus port such that said universal serial bus port is located intermediate of said button and said rechargeable battery port;
 v) housing a rechargeable power supply source within said base member;
 vi) housing an audio/video playback device within said base member;
 vii) providing a user interface formed in a top surface of said base member and electrically coupled to said audio/video playback device;
 viii) electrically coupling a satellite radio to said user interface;
 ix) electrically coupling a processor to said user interface;
 x) electrically coupling a memory to said processor;
 xi) electrically coupling a transmitter to said user interface and in wireless communication with said at least one receiving unit; and
 xii) hingedly attaching a rigid and planar lid to said base member, said lid being coextensively shaped with said base member and further covering said top surface of said base member and said user interface respectively when said lid is biased to a closed position, said lid being provided with a first liquid crystal display screen formed in an inner surface thereof and further being provided with a second liquid crystal display screen formed in an outer surface thereof respectively;

wherein said button of said base member receives and captures said lid when said lid is biased to the closed position thereby prohibiting said lid from prematurely and undesirably biasing from the closed position during operating conditions.

10. The method of claim 9, wherein step b) comprises the steps of:
 i) providing an elongated and flexible tube having opposed first and second ends respectively;
 ii) providing a speaker formed in said second end of said tube;
 iii) electrically coupling an amplifier to said speaker and housed within said second end of said tube;
 iv) electrically coupling a receiving device to said amplifier and housed within said second end of said tube; and
 v) providing a microphone formed with said first end of said tube, said microphone being electrically coupled to said receiving device of said second end of said tube.

11. The method of claim 10, wherein step c) comprises the steps of:
 i) providing a deformably resilient and flexible wire having opposed top and bottom ends respectively;
 ii) removably securing said bottom end of said wire directly to said tube of said at least one portable receiving unit, said wire being wrapped about the user ear such that said speaker of said at least one portable receiving unit is statically positioned within the user ear during operating conditions; and
 iii) providing a cushioned covering surrounding a major longitudinal length of said wire and terminating proximal to said bottom end of said wire.

12. The method of claim 11, wherein step d) comprises the steps of:
 i) attaching a top surface of a flexible strap directly to a bottom surface of said base member, said strap having opposed right and left ends respectively, said strap having a longitudinal length greater than a lateral width of said base member and oriented at a right angle thereto;
 ii) a providing a plurality of holes formed in said right end of said strap, said holes being equidistantly spaced along a major portion of said strap, each said holes being oriented along a centerline of said strap defined by said longitudinal length of said strap; and
 iii) attaching a buckle directly to said left end of said strap; wherein said strap secures said transmitting unit about the selected user body part, said holes and said strap and said buckle respectively cooperating to prohibit said strap from prematurely and undesirably disconnecting from the selected user body part during operating conditions.

13. The method of claim 12, wherein step e) comprises the steps of:
 i) removably affixing a rigid cover over said lid and said base member respectively when said lid is in the closed position.

14. The method of claim 13, wherein said at least one portable receiving unit comprises:
 a first receiver comprising
  an elongated and flexible tube being provided with opposed first and second ends respectively;
  a speaker formed in said second end of said tube;
  an amplifier electrically coupled to said speaker and housed within said second end of said tube;
  a receiving device electrically coupled to said amplifier and housed within said second end of said tube; and
  a microphone formed with said first end of said tube, said microphone being electrically coupled to said receiving device of said second end of said tube; and
 a second receiver comprising
  a speaker formed in said second receiver;
  an amplifier electrically coupled to said speaker and housed within said second receiver; and
  a receiving device electrically coupled to said amplifier and housed within said second receiver;

wherein each of said first and second receivers respectively is in wireless communication with said transmitting unit;

wherein each of said first and second receivers respectively is removably interfitted within an associated one of the user ears during operating conditions.

15. The method of claim 14, wherein said at least one portable receiving unit comprises:

first and second receivers respectively, each of said respective first and second receivers comprising an elongated and flexible tube being provided with opposed first and second ends respectively;

a speaker formed in said second end of said tube;

an amplifier electrically coupled to said speaker and housed within said second end of said tube;

a receiving device electrically coupled to said amplifier and housed within said second end of said tube; and a microphone formed with said first end of said tube, said microphone being electrically coupled to said receiving device of said second end of said tube;

wherein each of said respective first and second receivers is removably interfitted within an associated one of the user ears during operating conditions.

16. The method of claim 15, wherein said at least one portable receiving unit comprises:

an elongated and flexible tube being provided with opposed first and second ends respectively;

a speaker formed in each of said first and second ends respectively of said tube;

an amplifier electrically coupled to each of said speakers respectively and housed within said tube;

a receiving device electrically coupled to each of said amplifiers respectively and housed within said tube; and a microphone formed in a medial portion of said tube, said microphone being electrically coupled to each of said receiving devices respectively of said tube;

wherein said first end and said second end respectively of said tube are removably interfitted within an associated one of the user ears during operating conditions.

* * * * *